United States Patent [19]

Ishizaki et al.

[11] Patent Number: 5,730,182
[45] Date of Patent: Mar. 24, 1998

[54] PRESSURE COMPENSATION VALVE

[75] Inventors: Naoki Ishizaki; Toshiro Takano, both of Tochigi-ken, Japan

[73] Assignee: Komatsu Ltd., Tokyo, Japan

[21] Appl. No.: 776,677

[22] PCT Filed: Aug. 3, 1995

[86] PCT No.: PCT/JP95/01546

§ 371 Date: Feb. 4, 1997

§ 102(e) Date: Feb. 4, 1997

[87] PCT Pub. No.: WO96/04482

PCT Pub. Date: Feb. 15, 1996

[30] Foreign Application Priority Data

Aug. 5, 1994 [JP] Japan ................... 6-184622
Dec. 7, 1994 [JP] Japan ................... 6-303440

[51] Int. Cl.$^6$ ..................... F15B 11/05; F15B 11/16
[52] U.S. Cl. ............... 137/491; 137/492.5; 137/906; 137/489
[58] Field of Search ................... 137/491, 489, 137/490, 492, 492.5, 906, 115.23; 251/54

[56] References Cited

U.S. PATENT DOCUMENTS

| | | | |
|---|---|---|---|
| 3,636,969 | 1/1972 | Jacobellis | 137/906 |
| 3,747,633 | 7/1973 | Garrett | 137/491 |
| 3,752,174 | 8/1973 | Turolla | 137/491 |
| 4,013,093 | 3/1977 | Pensa | 137/491 |
| 4,476,890 | 10/1984 | Kwasaki et al. | 137/491 |
| 4,516,601 | 5/1985 | Chanal et al. | 137/906 |
| 4,548,231 | 10/1985 | Schwede | 137/492.5 |
| 4,552,173 | 11/1985 | Vayra | 137/492.5 |
| 4,580,594 | 4/1986 | Petts | 137/491 |
| 4,597,410 | 7/1986 | Wilke | 137/491 |
| 4,860,788 | 8/1989 | Asaoka | 137/491 |
| 5,033,505 | 7/1991 | Eidsmore | 137/906 |
| 5,072,752 | 12/1991 | Kolchinsky | 137/491 |
| 5,271,428 | 12/1993 | Dunn et al. | 137/906 |
| 5,460,198 | 10/1995 | Kortge | 137/491 |

FOREIGN PATENT DOCUMENTS

| | | |
|---|---|---|
| 59-197603 | 11/1984 | Japan . |
| 64-69804 | 3/1989 | Japan . |
| 2-18903 | 2/1990 | Japan . |

Primary Examiner—Denise L. Ferensic
Assistant Examiner—Joanne Y. Kim
Attorney, Agent, or Firm—Wenderoth, Lind & Ponack

[57] ABSTRACT

A pressure compensation valve is constructed with a valve establishing and blocking a communication between an inlet port and an outlet port, a pressure receiving chamber, a piston driven by a load pressure within the pressure receiving chamber and shifting the valve in blocking direction, an intermediate pressure receiving chamber communicated with the inlet port via a first conduit and pushing the valve in blocking direction by the pressure therein, and a pressure variable relief valve for relieving a pressurized fluid in the intermediate pressure chamber to the outlet port via a second conduit.

3 Claims, 3 Drawing Sheets

5,730,182

PRESSURE COMPENSATION VALVE

TECHNICAL FIELD

The present invention relates to a pressure compensation valve to be employed in a hydraulic circuit for distributing in flow rate a discharged pressurized fluid of one or more hydraulic pumps in a constructional machine for supplying a plurality of actuators.

BACKGROUND ART

Supplying a discharge pressurized fluid of a hydraulic pump to a plurality of actuators, can be done by providing a plurality of operation valves in a discharge path of the hydraulic pump and supplying a pressurized fluid to respective hydraulic actuators by switching the operation valves. With such construction, upon supplying the pressurized fluid to a plurality of hydraulic actuators simultaneously, the pressurized fluid may supplied to only hydraulic actuators having small load, and not pressurized fluid can be supplied to the hydraulic actuator having large load.

As a hydraulic circuit solving the problem, there has been proposed one disclosed in Japanese Unexamined Patent Publication No. Showa 59-197603.

This is constructed by providing a plurality of operation valves in a discharge path of a hydraulic pump, providing pressure compensation valves in circuits connecting respective operation valves and respective hydraulic actuators, respectively, detecting the highest load pressure among pressures, namely load pressure in all of the circuits by a shuttle valve, setting respective pressure compensation valve at a pressure corresponding to the load pressure by applying the detected load pressure to respective pressure compensation valves and whereby equalizing the output side pressures of the operation valves to enable supply of the pressurized fluid to respective actuators at distribution ratio proportional to open areas of respective operation valves when respective operation valves are operated simultaneously.

In such hydraulic circuit, since flow amount can be distributed proportional to open areas of respective operation valves without respect to large and small of the load pressures in respective hydraulic actuators, by the function of the pressure compensation valves. Therefore, the discharged pressurized fluid of one hydraulic pump can be supplied to respective hydraulic actuators proportionally to operation amount of the operation valves.

As the pressure compensation valve to be employed in such hydraulic circuit, there is one illustrated in FIG. 1, for example.

Namely, this is constructed by coaxially forming a bore 8 communicating an inlet port 1 and an outlet port 2 and a mounting bore 9 opening to the output port 2, in the valve body 7. In the bore 8, a valve 3 for establishing and blocking communication between the inlet port 1 and the output port 2 are slidably disposed. Within a sleeve 4 threadingly engaged with the mounting bore 9, a piston 5 pushing the valve 3 in blocking direction is slidably disposed. Between the sleeve 4 and the piston 5, a pressure receiving chamber 6 is defined. Then, the piston 5 is pushed by a pressure (load pressure) P2 in the pressure receiving chamber 6 in a direction for pushing the valve 3 in blocking direction so that a pressure (inlet pressure) P3 of the input port 1 becomes equal to the pressure P2.

In the conventional pressure compensation valve as set forth above, a force for pushing the piston 5 in the blocking direction is a product of an area A of a pressure receiving portion 5a of the piston 5 and the load pressure P2. Thus, when the area A becomes greater, the force for pushing the piston 5 in the blocking direction becomes greater to make the inlet pressure P3 higher, and when the area A becomes smaller, the force for pushing the piston 5 in the blocking direction becomes smaller to make the inlet pressure P3 lower.

Therefore, in order to vary a pressure compensation characteristics (the inlet pressure P3 according to the same load pressure P2), the area A of the pressure receiving portion 5a of the piston 5 may be varied. For example, when the pressure receiving area A of the pressure receiving portion 5a is set greater, the force to pushing the piston 5 in the blocking direction becomes greater despite of the fact that the load pressure P2 is the same, and as a result, the inlet pressure P3 becomes greater to make it difficult to flow the pressurized fluid. On the other hand, by making the area A of the pressure receiving portion 5a smaller, the force for pushing the piston 5 in the blocking direction becomes smaller. As a result, the inlet pressure P3 becomes smaller to make flowing of the pressurized fluid easier.

However, in order to vary the pressure receiving area A of the piston 5, in conjunction with exchanging of the piston 5 with that having different diameter, the sleeve 4 has to be exchanged to one having different diameter to make cost higher.

Therefore, the present invention has been worked out in view of the drawbacks set forth above. It is an object of the present invention to provide a pressure compensation valve which permits to vary the pressure compensation characteristics without exchanging the piston or sleeve, and thus can maintain a cost low.

DISCLOSURE OF THE INVENTION

In order to accomplish the above-mentioned object, a pressure compensation valve, according to one aspect of the invention, comprising:

a valve establishing and blocking a communication between an inlet port and an outlet port;

a pressure receiving chamber;

a piston driven by a load pressure within the pressure receiving chamber and shifting the valve in blocking direction;

an intermediate pressure receiving chamber communicated with the inlet port via a first conduit and pushing the valve in blocking direction by the pressure therein; and a pressure variable relief valve for relieving a pressurized fluid in the intermediate pressure chamber to the outlet port via a second conduit, is provided.

With the construction set forth above, since the valve is pushed in blocking direction by the intermediate pressure of the intermediate pressure receiving chamber, the force pushing the valve in the blocking direction is varied by varying the intermediate pressure, and thus the inlet pressure is varied even when the load pressure is the same. Furthermore, the intermediate pressure of the intermediate pressure receiving chamber is varied by varying the set pressure of the relief valve. Therefore, by varying the set pressure of the relief valve, the pressure compensation characteristics of the pressure compensation valve can be varied.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings.

BEST MODE FOR IMPLEMENTING THE INVENTION

The preferred embodiments of a pressure compensation valve according to the present invention will be discussed hereinafter with reference to the accompanying drawings.

At first, discussion will be given with respect to the first embodiment of a pressure compensation valve according to the present invention.

Figure 1:
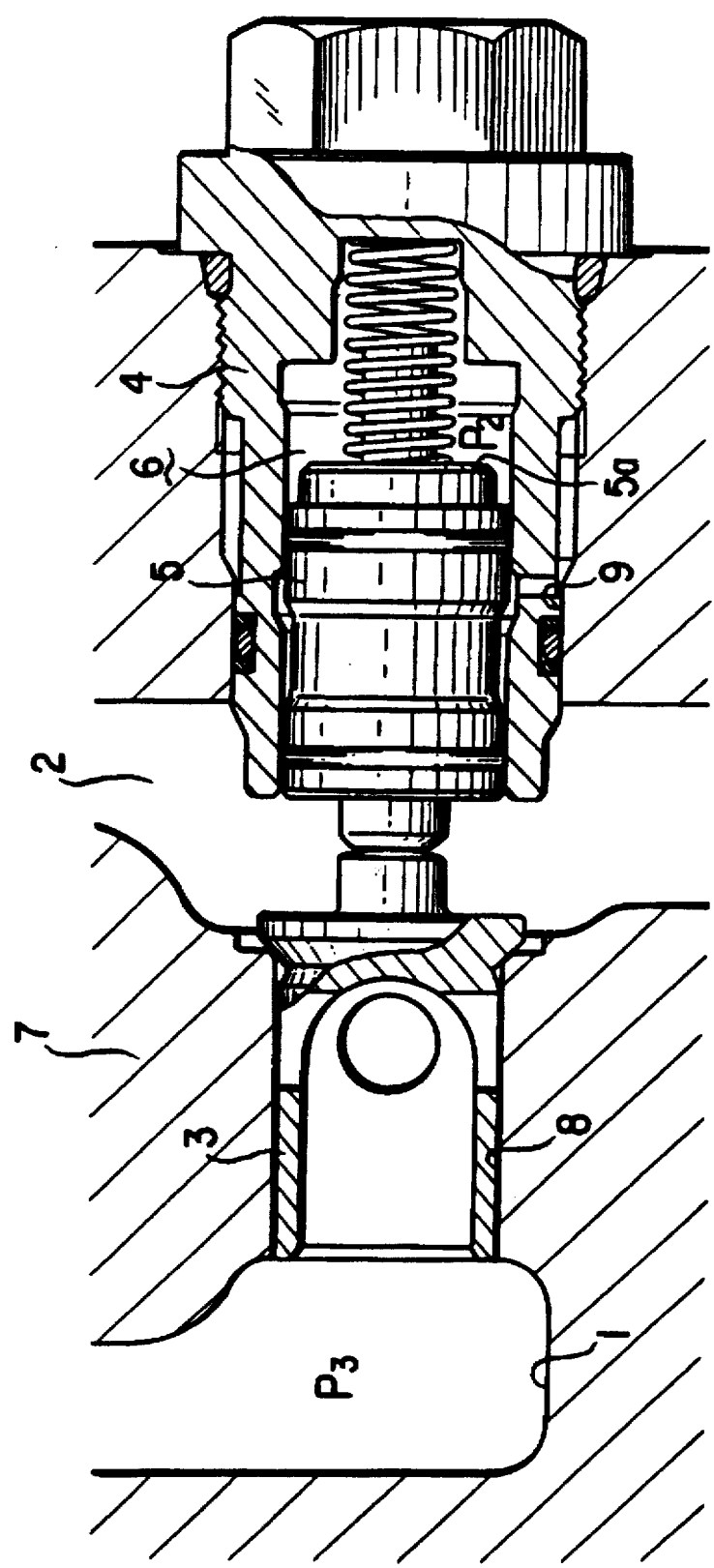
FIG. 1 is a section of the conventional pressure compensation valve.
Figure 2:
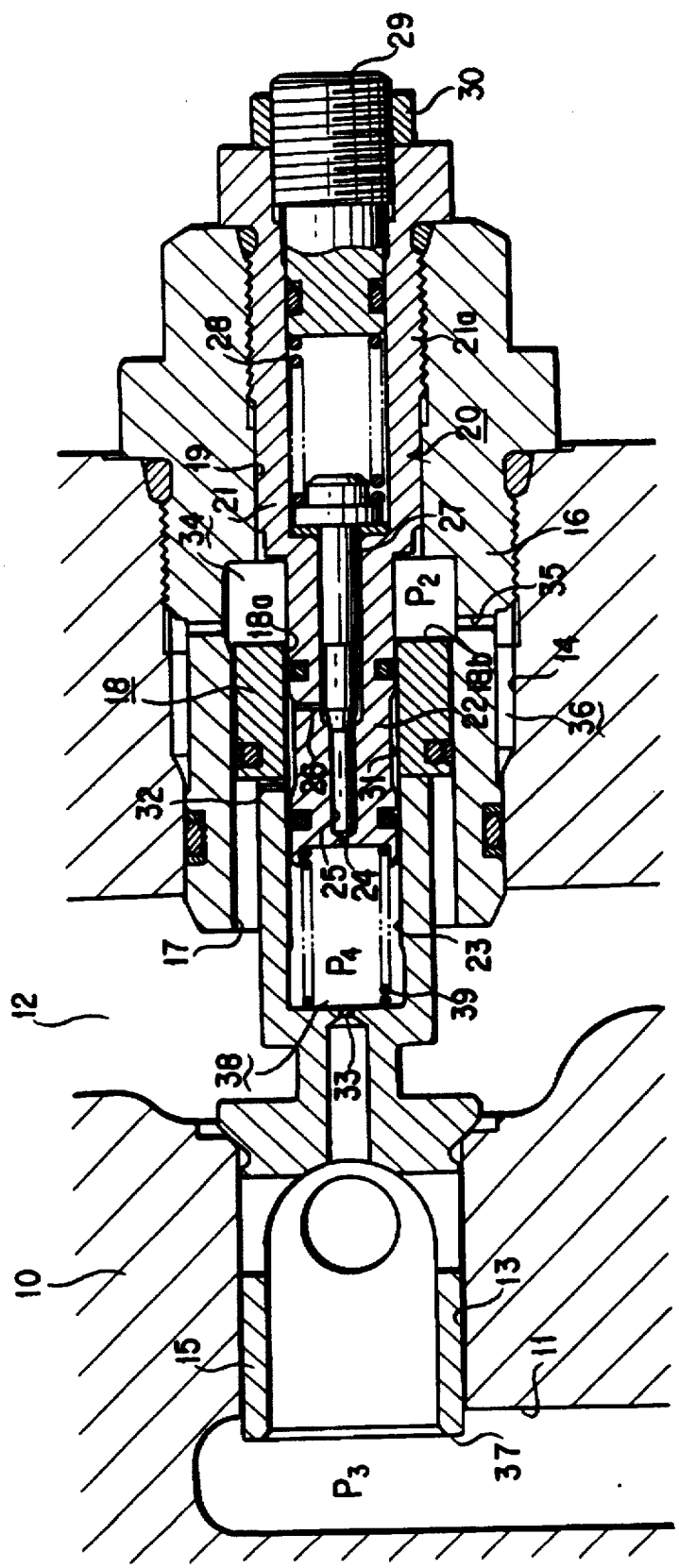
FIG. 2 is a section of the first embodiment of a pressure compensation valve according to the present invention.

As shown in FIG. 2, in a valve body 10, a bore 13 communicating an inlet port 11 and an outlet port 12 and a mounting bore 14 opening to the outlet port 12 are formed in opposition to each other in coaxial fashion. In the bore 13, a valve 15 for establishing and blocking a communication between the inlet port 11 and the outlet portion 12 is slidably disposed. On the other hand, a sleeve 16 is set in the mounting bore 14.

On one end portion of the sleeve 16, namely, in a first axial bore 17 located at the outlet port 12 side and having a larger diameter, a piston 18 is disposed. In a second axial bore 19 having smaller diameter and located on the other end of the sleeve 16, a larger diameter base end portion 21a of a relieve valve body 21 is threadingly disposed. The smaller diameter tip end 22 of the relief valve main body 21 extends through the bore 18a of the piston 18 and slidably engaged with a bore 23 at the outlet port 12 side end portion.

Within the relief valve body 21, a relief valve 27 which establishes and blocks communication between the inlet side hole 25 and an outlet side hole 26 which are communicated with the bore 23 through a conduit 24. The relief valve 27 is pushed in the blocking direction by means of a spring 28. A spring seat 29 receiving the spring 28 which is threadingly engaged with the relief valve main body 21 can be loosened and tightened in loosening of a lock nut 30. By tightening and loosening the spring seat 29, a spring load is varied to vary a set pressure of the relief valve. This forms a set pressure variable type relief valve 20.

The outlet side bore 26 is communicated with the outlet port 12 by an annular recess 31 and a radial conduit 32 formed in the valve 15. The bore 23 defines an intermediate pressure receiving chamber 38 by disposing the small diameter portion 22 of the relief valve body 21. The inlet port 11 is communicated with the intermediate pressure chamber 38 via an axial conduit 33 formed in the valve 15. A pressure receiving chamber 34 defined between the sleeve 16 and the piston 18 is communicated with an annular space 36 through a radial conduit 35 formed in the sleeve 16 so that the highest load pressure may be also supplied to the annular space 36.

Then, the piston 18 pushes the valve 15 in blocking direction as pushed toward left in the drawing by a force as a product of the load pressure P2 in the pressure receiving chamber 34 and the area A of the pressure receiving portion 18b. On the other hand, the valve 15 is pushed in the communicating direction by an inlet pressure P3 acting on the inlet port side pressure receiving portion 37, and is pushed in the blocking direction by an intermediate pressure P4 acting in the intermediate pressure receiving chamber 38 and a resilient force of a spring 39.

Next, an operation of the shown embodiment will be discussed.

A high pressure fluid flowing into the inlet port 11 flows into the inlet side hole 25 through the conduit 33, the intermediate pressure receiving chamber 38 and the conduit 24. If the pressure at that time is higher than or equal to the set pressure of the relief valve 20, the relief valve 27 is opened to flow out the fluid from the outlet port 12 through the outlet side hole 26, the annular recess 31 and the conduit 32.

At this time, a pressure loss is caused upon flowing through the conduit 33 so that the intermediate pressure P4 in the intermediate pressure receiving chamber 38 becomes lower than the inlet pressure P3.

Accordingly, a propelling force for the valve 15 is determined by the inlet pressure P3, the load pressure P2 and the intermediate pressure P4, and thus the inlet pressure P3 is determined.

On the other hand, the intermediate pressure as set forth above is variable depending upon the set pressure of the relief valve 20. For example, the intermediate pressure P4 becomes higher when the set pressure is high and lower when the set pressure is set low. Furthermore, the intermediate pressure P4 becomes a force for pushing the valve 15 in the blocking direction. Accordingly, by varying the intermediate pressure P4 by varying the set pressure of the relief valve 20, the pressure compensation characteristics of the pressure compensation valve can be varied.

For example, by setting the intermediate pressure P4 by lowering the set pressure of the relieve valve 20, the force pushing the valve 15 in the blocking direction becomes smaller, the inlet pressure P3 becomes lower to make flow of the pressurized fluid easier. On the other hand, by setting the set pressure of the relief valve higher to make the intermediate pressure P4 higher, the force for pushing the valve 15 in blocking direction becomes greater to make the inlet pressure P3 higher to make flow of the pressurized fluid restrictive.

Next, discussion will be given for the second embodiment of the present invention.

Figure 3:
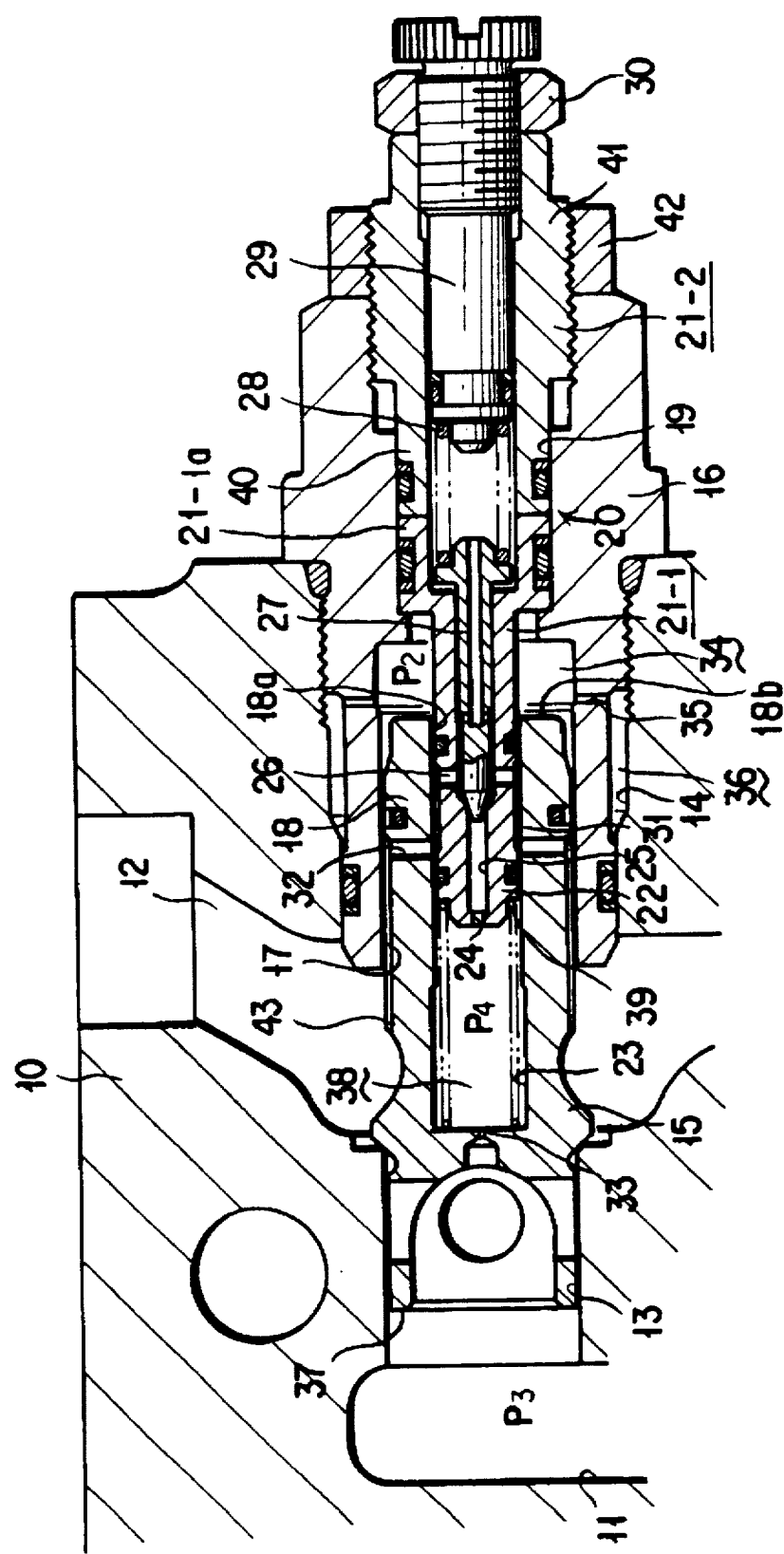
FIG. 3 is a section of the second embodiment of a pressure compensation valve according to the invention.

As shown in FIG. 3, in the valve body 10, the bore 13 communicating the inlet port 11 and the outlet port 12 and the mounting bore 14 opening to the outlet port 12 are formed in opposition to each other in coaxial fashion. In the bore 13, the valve 15 for establishing and blocking a communication between the inlet port 11 and the outlet portion 12 is slidably disposed. On the other hand, a sleeve 16 is threadingly engaged in the mounting bore 14.

On one end portion of the sleeve 16, namely, in the first axial bore 17 located at the outlet port 12 side and having a larger diameter, the piston 18 integrated with the valve 15 is disposed. In the second axial bore 19 having smaller diameter and located on the other end of the sleeve 16, a larger diameter base end portion 21-1a of a first relieve valve body 21-1 and a smaller diameter tip end portion 40 of a second relief valve 21-2 are disposed and a base end portion 41 of the second relief valve 21-2 is threadingly disposed. To the base end portion 41 is fixed by a lock nut 42. The smaller diameter tip end 22 of the first relief valve main body 21-1 extends through the bore 18a of the piston 18 and slidably engaged with a bore 23 at the outlet port 12 side end portion.

Within the first relief valve body 21-1, the relief valve 27 which establishes and blocks communication between the inlet side hole 25 and an outlet side hole 26 which are communicated with the bore 23 via the conduit 24. The relief valve 27 is pushed in the blocking direction by means of the spring 28. The spring seat 29 receiving the spring 28 which is threadingly engaged with the second relief valve 21-2 can be loosened and tightened in loosening of a lock nut 30. By tightening and loosening the spring seat 29, a spring load is varied to vary a set pressure of the relief valve. This forms a set pressure variable type relief valve 20.

The outlet side bore 26 is communicated with the outlet port 12 by an annular recess 31 and a conduit 32 in radial direction and an elongated hole 43 in axial direction formed in the valve 15. The bore 23 denotes an intermediate pressure receiving chamber 38 by disposing the small diameter portion 22 of the relief valve 20 therein. The inlet port 11 is communicated with the intermediate pressure chamber 38 via an axial conduit 33 formed in the valve 15. A pressure receiving chamber 34 defined between the sleeve 16 and the piston 18 is communicated with an annular space 36 through a radial conduit 35 formed in the sleeve 16 so that the highest load pressure may be also supplied to the annular space.

Then, the piston 18 and valve 15 push the valve 15 in blocking direction as pushed toward left in the drawing by a force as a product of the load pressure P2 in the pressure receiving chamber 34 and the area A of the pressure receiving portion 18b. On the other hand, the valve 15 and the piston 18 are pushed in the communicating direction by an inlet pressure P3 acting on the inlet port side pressure receiving portion 37, and is pushed in the blocking direction by an intermediate pressure P4 acting in the intermediate pressure receiving chamber 38 and a resilient force of a spring 39.

Namely, the second embodiment is constructed by integrating the valve 15 and the piston 18 in the first embodiment, and forming the relief valve main body with two main bodies 21-1 and 21-2. The operation is the same as the first embodiment.

As set forth above, the pressure compensation valve according to the present invention can vary the pressure compensation characteristics of the pressure compensation valve by varying the intermediate pressure P4 by varying the set pressure of the relief valve 20.

Accordingly, the pressure compensation characteristics can be varied without exchanging the piston or sleeve, and can maintain the cost low.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

We claim:

1. A pressure compensation valve comprising:

a first valve establishing and blocking a communication between an inlet port and an outlet port;

a pressure receiving chamber;

a piston driven by a load pressure within said pressure receiving chamber to shift said first valve in a blocking direction;

an intermediate pressure receiving chamber communicated with said inlet port via a first conduit and pushing said first valve in the blocking direction by the pressure therein; and a variable pressure relief valve for relieving a pressurized fluid in said intermediate pressure chamber to said outlet port via a second conduit.

2. A pressure compensation valve as set forth in claim 1, wherein said first valve is formed separately from said piston.

3. A pressure compensation valve as set forth in claim 1, wherein said first valve is integrally formed with said piston.

* * * * *